(12) United States Patent
Linner (10) Patent No.: US 10,060,093 B2
(45) Date of Patent: Aug. 28, 2018

(54) DEVICE FOR RECEIVING AND REMOVING PLASTIC, SLUDGE-LIKE MATERIALS DEPOSITED ON BEDS OF BODIES OF WATER

(71) Applicant: Georg Linner, Rechtmehring (DE)

(72) Inventor: Georg Linner, Rechtmehring (DE)

( * ) Notice: Subject to any disclaimer, the term of this patent is extended or adjusted under 35 U.S.C. 154(b) by 3 days.

(21) Appl. No.: 15/304,347

(22) PCT Filed: Apr. 13, 2015

(86) PCT No.: PCT/DE2015/000186
§ 371 (c)(1),
(2) Date: Oct. 14, 2016

(87) PCT Pub. No.: WO2015/158322
PCT Pub. Date: Oct. 22, 2015

(65) Prior Publication Data
US 2017/0037598 A1    Feb. 9, 2017

(30) Foreign Application Priority Data
Apr. 16, 2014   (DE) .................. 10 2014 005 737

(51) Int. Cl.
*E02F 5/00*  (2006.01)
*E02F 9/02*  (2006.01)
(Continued)

(52) U.S. Cl.
CPC .............. *E02F 5/006* (2013.01); *B62D 55/06* (2013.01); *B62D 55/125* (2013.01);
(Continued)

(58) Field of Classification Search
CPC . E02F 5/006; E02F 3/8866; E02F 5/28; E02F 9/02; E02F 7/00; E02F 7/005; B62D 55/06; B62D 55/125
See application file for complete search history.

(56) References Cited

U.S. PATENT DOCUMENTS 3,382,943 A * 5/1968 Anderson .............. B62D 55/06
                                                      180/9.1
3,513,081 A * 5/1970 Wanzenberg ......... E02F 3/8858
                                                      204/278
(Continued)

FOREIGN PATENT DOCUMENTS

CN   201183967 Y    1/2009
DE   22 36 448 C3   3/1975
(Continued)

OTHER PUBLICATIONS

International Search Report of PCT/DE2015/000186, dated Sep. 21, 2015.

*Primary Examiner* — Tara Mayo-Pinnock
(74) *Attorney, Agent, or Firm* — Collard & Roe, P.C.

(57) ABSTRACT

A device for receiving and removing plastic, sludge-like materials deposited on beds of bodies of water. The device systematically senses the bottom of the body of water, suctions it off layer by layer, and independently moves along even if coarse obstacles are present. The device has at least one pump/compressor, at least one hydraulic unit and at least one electric power generator and is connected on one side to a disposal site or a settling basin or a transportable container on land and on the other side to the suction module by pipelines. The suction module moves along on the bottom independently by a special tracked chassis unit, is connected by a cable to an echo sounding emitter arranged floatingly above the suction module and/or to a GPS receiver, and has a pivoting arm, which independently adapts to the bed of the body of water and oscillates freely.

20 Claims, 11 Drawing Sheets (51) Int. Cl.
*B62D 55/125* (2006.01)
*E02F 3/88* (2006.01)
*E02F 5/28* (2006.01)
*B62D 55/06* (2006.01)

(52) U.S. Cl.
CPC .............. *E02F 3/8866* (2013.01); *E02F 5/28* (2013.01); *E02F 9/02* (2013.01)

(56) References Cited

U.S. PATENT DOCUMENTS

| | | | |
|---|---|---|---|
| 3,551,930 A | 1/1971 | Myers | |
| 3,672,725 A * | 6/1972 | Johnson | E02F 3/8858 299/8 |
| 3,731,975 A * | 5/1973 | Lindelof | E02F 5/006 299/8 |
| 3,947,980 A * | 4/1976 | Andrews | E02F 3/081 299/18 |
| 3,995,439 A | 12/1976 | Hahlbrock | |
| 4,195,426 A * | 4/1980 | Banzoli | E02F 3/081 37/309 |
| 4,560,418 A | 12/1985 | Raubenheimer | |
| 6,755,701 B2 * | 6/2004 | Dornier, II | B60F 3/0061 37/307 |
| 6,922,922 B2 | 8/2005 | Cheramie | |
| 2013/0306524 A1* | 11/2013 | Welch | B03B 5/56 209/10 |

FOREIGN PATENT DOCUMENTS

| | | |
|---|---|---|
| DE | 24 11 140 A1 | 11/1975 |
| DE | 31 29 228 A1 | 2/1983 |
| DE | 201 617 A1 | 7/1983 |
| DE | 33 33 633 A1 | 4/1987 |
| DE | 39 23 113 A1 | 1/1991 |
| DE | 36 30 032 C2 | 5/1995 |
| DE | 199 60 361 A1 | 6/2001 |
| DE | 10 2004 017 201 A1 | 11/2005 |
| FR | 2 507 643 A1 | 12/1982 |
| WO | 2011/134733 A1 | 11/2011 |
| WO | 2012/158028 A1 | 11/2012 |

* cited by examiner

DEVICE FOR RECEIVING AND REMOVING PLASTIC, SLUDGE-LIKE MATERIALS DEPOSITED ON BEDS OF BODIES OF WATER

CROSS REFERENCE TO RELATED APPLICATIONS

This application is the National Stage of PCT/DE2015/000186 filed on Apr. 13, 2015, which claims priority under 35 U.S.C. § 119 of German Application No. 10 2014 005 737.2 filed on Apr. 16, 2014, the disclosures of which are incorporated by reference. The international application under PCT article 21(2) was not published in English.

The invention relates to a device for collecting and removing plastic, sludge-like materials deposited on beds of bodies of water, wherein the materials are to be sucked up systematically and in an environmentally tolerable manner.

In order to keep bodies of water clean and decontaminate seabeds, riverbeds and lake beds and revive the ground flora and fauna, it is known to pump and/or suction away the pollutants that cover the beds of bodies of water. This may be done for example with a tubular articulated arm with associated suction equipment, although this also requires relatively expensive equipment on board a carrier vessel (DE 3630032 C2).

Such a device is also described in DE 199 60 361 A1, in which a towing head of a trailing suction hopper dredger for removing mixtures of water and waterbed material from the bodies of water. The design of the towing head depends primarily on the type of bed material that is to be removed. The towing head is typically equipped with pressurised water nozzles, which are intended to create turbulence on the waterbed, so that the bed material can then be sucked up more easily.

A similar device is described in DD 201 617 B1, although in this case a floating pontoon is attached to a movable suction-flushing device, which is dragged along the waterbed via skids and winches. A strainer is mounted over the suction area to prevent large objects from being sucked in.

A further device for removing pumpable water body beds is known from DE 39 23 113 A1, in which an underwater device is constructed in the form of a bell with a nozzle system, including a submersible pump enclosed inside a suction head. The pump is connected to the underwater floating body via a flexible hose and a flexible supply and control line.

A similar device is described in document DE 10 2004 017 201 B4. In this case, the suction device is pulled through the water while floating on the end of a flexible hose.

Document DE 22 36 448 C3 discloses a water vehicle which is movable independently via a rear drive unit and has a suction tube equipped with a rotating brush at the inlet thereof. All such known waterbed suction devices have the same shortcomings:

It is not possible to carry out effective, systematic subsoil suction that deals gently with the waterbed.

It is not possible to suck the bed material off in layers.

There is no autonomous stepping mechanism. All such devices must be towed behind the suction dredge/vehicle and are not capable of functioning autonomously.

Monitoring of the suction device, which would allow a pilot to carry out controlling actions, is not possible.

Document DE 24 11 140 A1 describes a device which is designed to embed pipes lying on a waterbed, and which has a caterpillar chassis with a digging-sucking device. However, this device is still not able to remove and clean the bed of a body of water systematically. Furthermore, the caterpillar chassis is not constructed in a steerable model, its direction is determined by the embedded pipes.

DE 31 29 228 A1 describes a device for underwater dredging hard-packed ground in inland bodies of water as well as offshore. The self-propelled underwater suction-scraping vehicle consists essentially of a crawler unit, a scraping blade, a suction head and an armoured pump. Material is delivered hydraulically via a flexible hose to an escort vessel, from which the underwater suction-scraping vehicle is powered and steered. The underwater suction-scraping crawler is fitted with buoyancy bodies, which may be used to bring the vehicle back to the surface.

A known underwater suction devices that is also tethered to a ship and which is also equipped with a caterpillar chassis is known from WO 2012/158028 A1. The suction device is equipped with a known suction tube.

WO 2011/134733 A1 relates to a cutter suction dredger with a suction pipe and cutting head, wherein the cutting head comprises:
  a continuous track for moving the cutting head over a bed surface,
  at least one laser head on the segment for aiming a laser beam at the ground surface that is to be processed.

In U.S. Pat. No. 6,922,922 B2, an amphibious water vehicle designed for operation both on and under the water is described, wherein the vehicle has a caterpillar chassis, a roller for creating turbulence and a device for sucking up ground materials.

The disadvantage of the underwater crawler vehicles described is that they are not equipped with their own controller or a device for creating turbulence that is adapted to the waterbed and can oscillate freely.

Self-propelled suction heads for cleaning the bottoms of bodies of water which also use caterpillar chassis are known from swimming pool cleaning equipment. DE 33 33 633 C2 describes such a suction head.

Such a device is also known from U.S. Pat. No. 3,551,930.

However, all swimming pool cleaners have the following deficiencies in common:
  They are entirely unsuitable for use in open waters, because as a rule there is no direct connection to the land or to the water surface for removing the sludges (bag).
  The chassis are only suitable for relatively smooth bottom surfaces.
  The water bed is not cleaned systematically, but only according to a random principle.
  It is not possible to remove sludge from the water bed by layers.
  They cannot be controlled by an operator.
  Even if they were manufactured in a bigger size, they would become stuck in the sludge and/or the pumps would become blocked.

The problem addressed by the invention is therefore to develop a device that systematically senses the bottom of a body of water, gently sucks off the material of the bottom of the body of water layer by layer, and moves along the bottom even when large obstacles are present.

This is solved according to the invention with the device described herein.

The solution according to the invention relates to a suction unit that is steerable by a combination of imaging methods (sonar for the general overview, GPS and stationary cameras for the immediate environment), equipped for choreographed sludge removal, and manually optimised for travelling over water beds consisting of sludge/with variable density by means of buoyancy bodies and a caterpillar drive unit, and which loosens sludge and sediment with a sweeping roller, liquefies it with a targeted jet consisting of the surrounding water, collects it in a suction bell designed specifically for this purpose, first breaking up large bodies with a rake-like construction, guides the sweeping roller mounted in oscillating manner past larger obstacles, combines small particles and plant parts from suction channels of variable number by means of a series-connected cutting and chopping mechanism which reduces the plant fibres and foreign bodies to less than 3 cm in size to prevent the coupled pumps from becoming clogged or blocked.

The pumps are located beside the hydraulic and compressed air unit on the control unit, a floating body that is controllable with an outboard motor, a catamaran for example, which collects the suction hoses coming from the suction module to after the pumps and is bonded or otherwise connected via a flat hose to another hose filled with compressed air for surfacing purposes to guide the hose line on the water surface without obstruction.

However, the pump(s) may also be arranged on or inside the suction bell. If it/they is/are arranged on or inside the suction bell, it/they may be connected to the sludge pond or sedimentation tank or the transportable container via a pipeline and the floating body or via a direct connection.

In prior methods, such as suction dredging for example, the suction unit is positioned indirectly via the float unit. Accordingly, this must first be brought into position, from which position the suction unit may then be controlled by guesswork. This represents a highly inaccurate control option. With the solution according to the invention, the control unit is the passive part. The suction module is manoeuvred precisely into the part that is to be suctioned out using echo-sounder monitoring, pulling the control unit behind it. If necessary, however, it may also be positioned specifically. Other systems (swimming pool vacuum systems) use a chaotic control system as the robot, but this is not practical for the dimensions of ponds or lakes, since hoses would have to be repositioned constantly, or a chaotic control system is out of the question because certain areas, such as protected water lily area must be excluded. In this case too, other suction mechanisms must be put in position manually, which is very ineffective.

The example of the swimming pool vacuum system clearly shows that the caterpillar track and the entire suction unit must be designed for an expanse that is sludgy and difficult to traverse. A swimming pool vacuum would not make any progress at all in the intended operating area. The caterpillar track of the solution according to the invention has a sloping shape in the front and rear and an enormous bearing surface so that it is impossible for the vehicle to become stuck in the sludge or sink into it. Propulsion is provided via a toothed rack secured to the inside of the caterpillar track, with which a gearwheel of a drive unit engages.

By monitoring with the aid of the echo-sounder and/or the GPS systems and/or the camera system, sludge removal can be carried out over the full area as described. A combination of all three systems is possible. This also makes is possible to remove the sludge to a defined depth according to the customer's wishes, since it is removed in layers of approximately 30 cm. Thus, with this operating method does not leave behind an uneven, cratered bottom. It may be necessary to remove a defined quantity if the sludge is very thick, several meters deep for example, but the customer does not wish to remove it all for reasons of cost, time or disposal options, but removal of the top layer promises to alleviate the problems that are caused by the sludge.

Use of the oscillating sweeping roller effectively prevents the original bed profile from being made deeper. Mussels larger than a centimeters are separated out by the rake and not destroyed by the flexible bristles. Unlike suction dredges weighing several tons, no damage to the ecology of the bank or shore is expected at tooling times, because the weight of the sludge suction unit remains below 200 kg and this weight is spread over the waterbed via the caterpillar tracks.

In the solution according to the invention, the pump is designed for extremely dirty water.

The upstream cutting unit chops up foreign bodies that are too large or in which the fibres are too long. Again, the rake-lake scraper located upstream of the cutting unit separates excessively large foreign bodies at the outset.

One or more mower units may also be arranged in front of the caterpillar chassis. This may be necessary if the bed of the body of water is covered very densely with plants or plant residues or other contaminants, or if mowing the plants is a part of the work assignment.

Unlike the know pool vacuum systems, the sweeping roller of the solution according to the invention is supported so as to able to oscillate, so that it may also be adapted to an irregularly shaped ground profile. This ensures that the suction module cannot be damaged. Accordingly, the suction module does not become hung up or trapped.

With the rake-like scraper, which partially encloses the sweeping roller and engages in the bristles thereof, it is ensured that the scraper does not become blocked during operation.

The special arrangement of the plate or the baffle plate inside the suction bell also serves to prevent blockages and regulates the flow, rake-like scraper being attached to the end of the plate or baffle, and partly engages around and in the bristles of the sweeping roller, as was described earlier.

LIST OF REFERENCE SIGNS USED

1 Bearing
2 Pivoting arm
3 Sealing plate
4 Suction bell
5 Cutting unit
6 Sweeping roller
7 Rake/Scraper
8 Motor/Drive unit
9 Suction port/Flange
10 Caterpillar track
11 Suction module
12 Control unit
13 Pump
14 Suction hose
15 Hydraulic line
16 Hydraulic unit
17 Hydraulic controller
18 Floating body
19 Compressor
20 Power set
21 Dirty water collector
22 Collecting pressure hose
23 Deflection rollers
24 Hose as buoyancy body
25 Water surface
26 Echo-sounder
27 Emission cone
28 Sludge 29 Suctioned sludge
30 Cable/Extendable fishing line

EXEMPLARY EMBODIMENT

In the following, the invention will be explained in greater detail with reference to an exemplary embodiment thereof.

Figure 1:
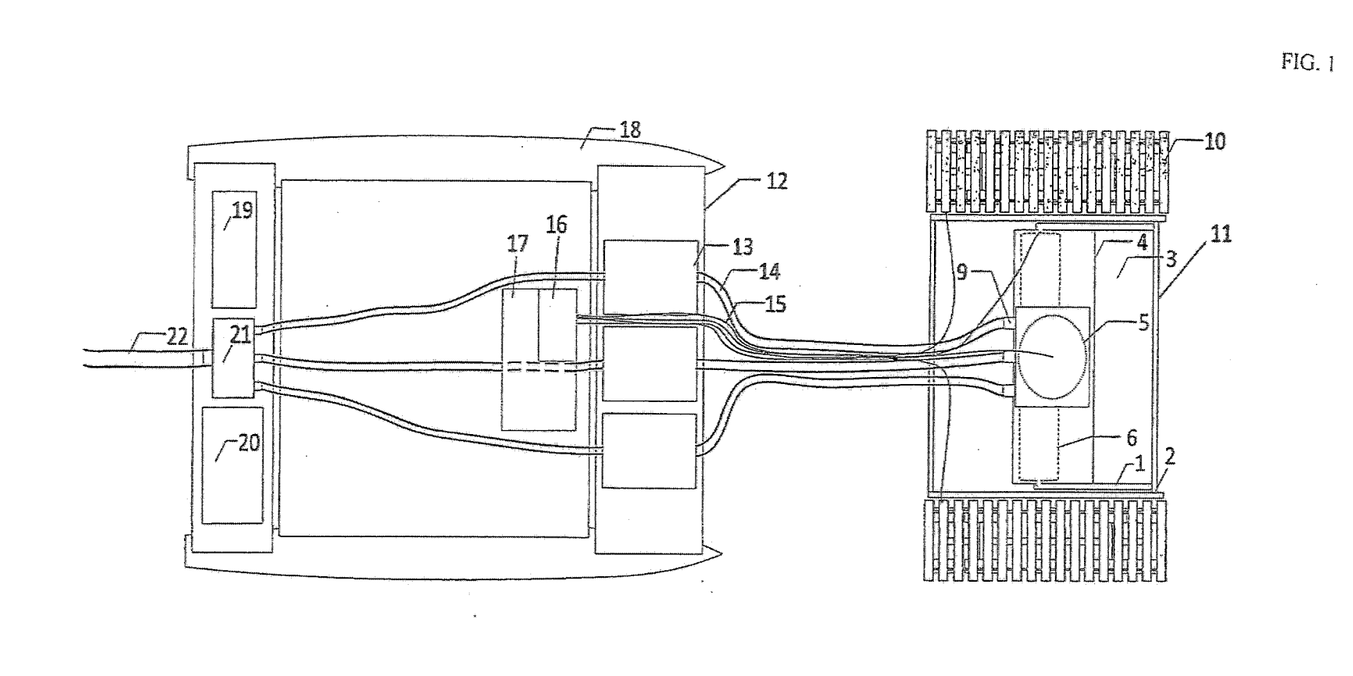
FIG. 1—shows a top view of the entire device in use
Figure 2:
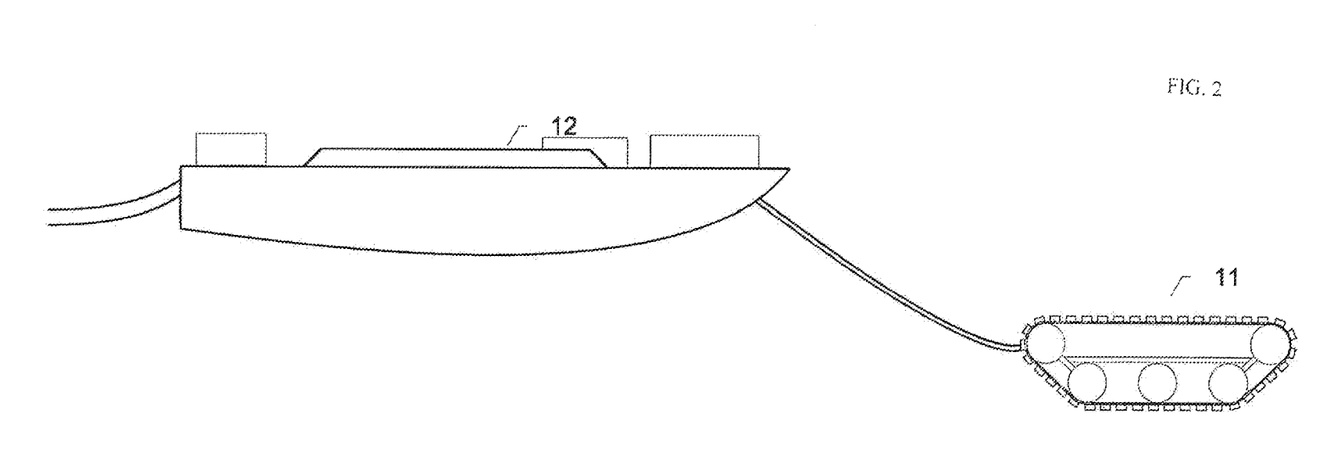
FIG. 2—shows a side view of the entire device in use
Figure 3:
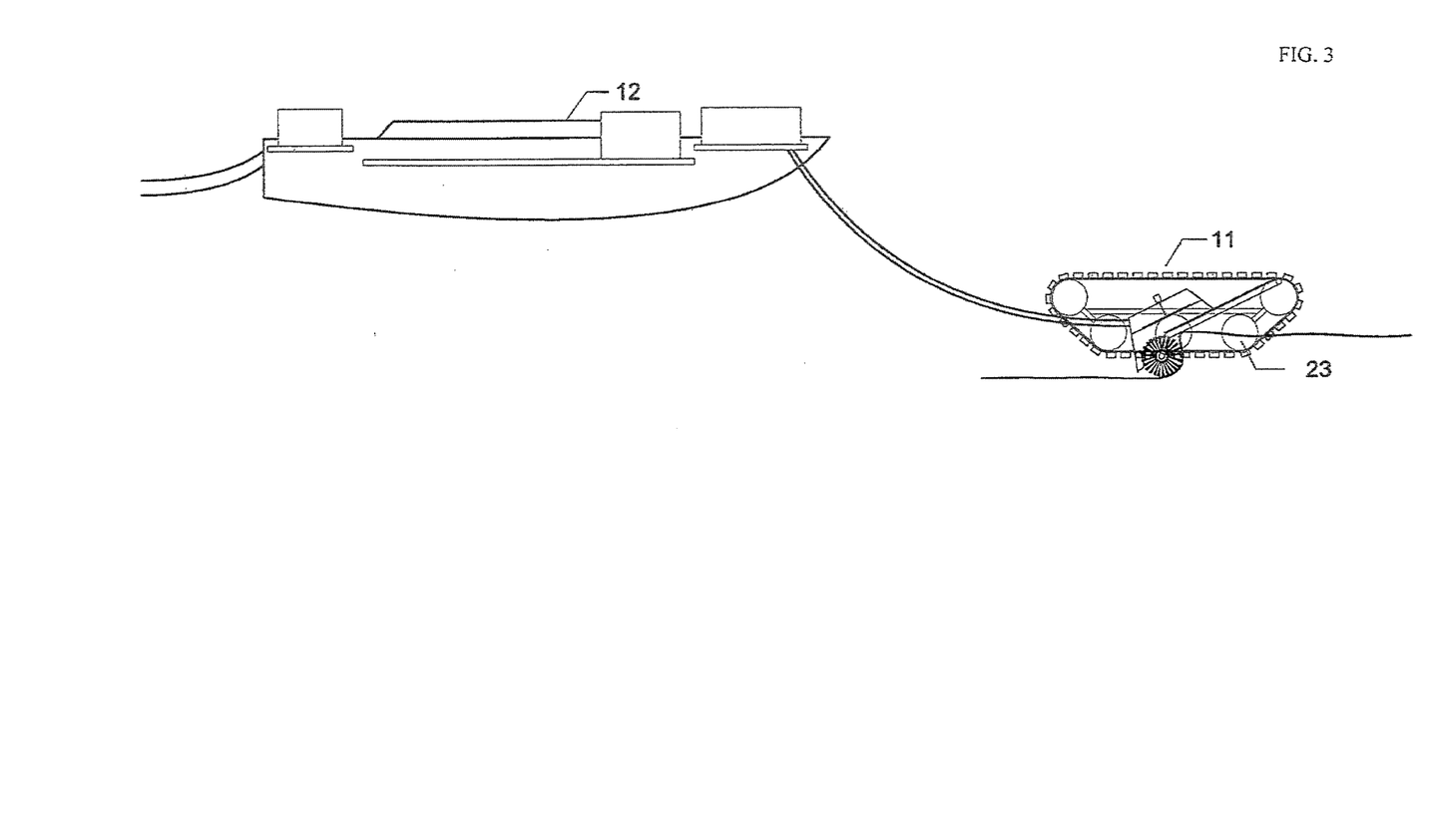
FIG. 3—shows a cross sectional view of the entire device in use

Control unit 12, which is preferably designed as a catamaran, includes a floating body 18. Floating body 18 holds a pump 13, a hydraulic unit 16, a hydraulic controller 17, a compressor 19, a power set 20 and a dirty water collector 21. On land, dirty water collector 21 is connected to a sludge pond or sedimentation tank or a mobile collector station for the wash material (not shown) via a collecting pressure hose 22. Collecting pressure hose 22 is coupled in the lengthwise direction thereof with an air hose 24 that functions as a buoyancy body.

Figure 4:
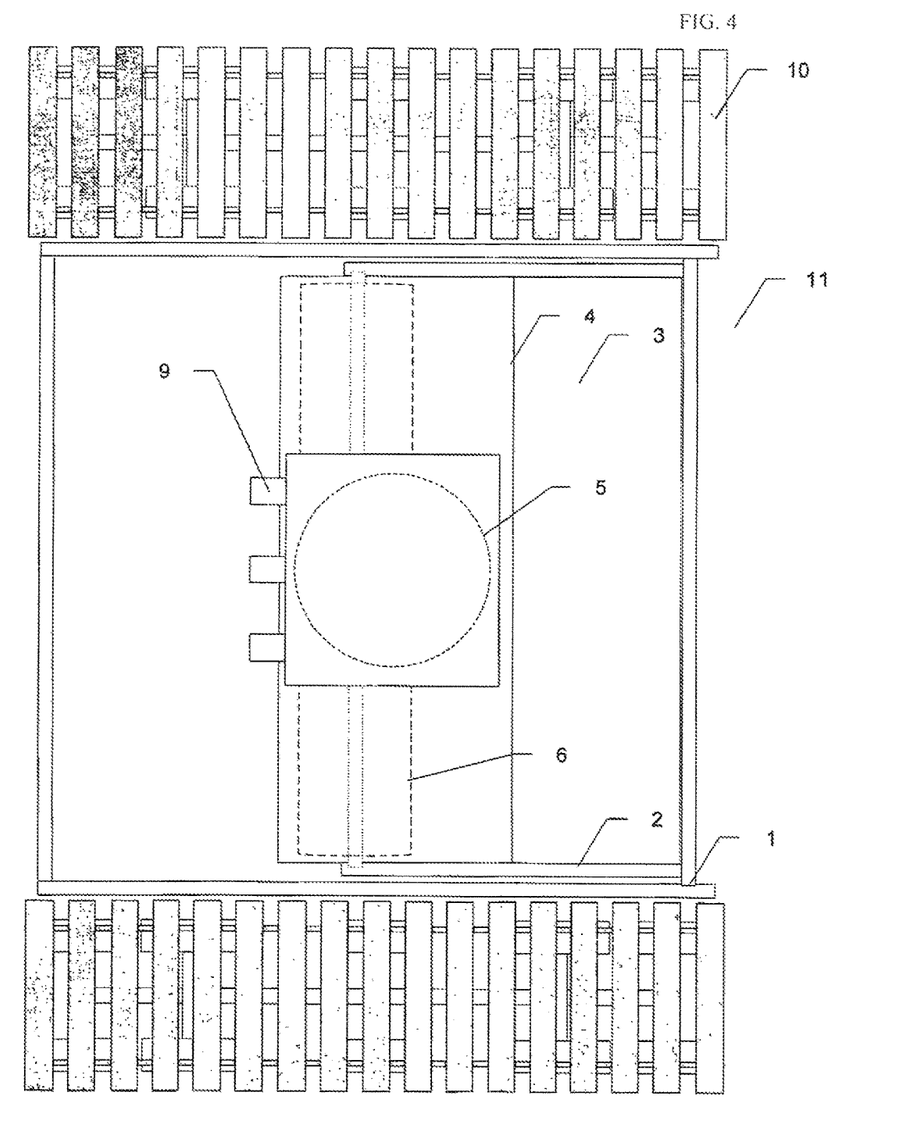
FIG. 4—shows a top view of the suction module with caterpillar chassis, pivoting arms and sweeping roller FIG. 5—shows cross section/side view of the suction module FIG. 6—shows a cross section view of the caterpillar chassis FIG. 7—shows the suction module with echo-sounder on the bed of the body of water FIG. 8—shows a cross section of the liquefier with pivoting arm, sweeping roller, suction bell, rake-like scraper (s), strainer and cutting unit FIG. 9—shows the floating pressure hose in cross section FIG. 10—is a bottom view of the liquefier FIG. 11—is a rear view of the liquefier Suction module 11 is connected to control unit 12 via suction hose 14 and hydraulic lines 15 (FIGS. 1, 2 and 3).
Figure 10:
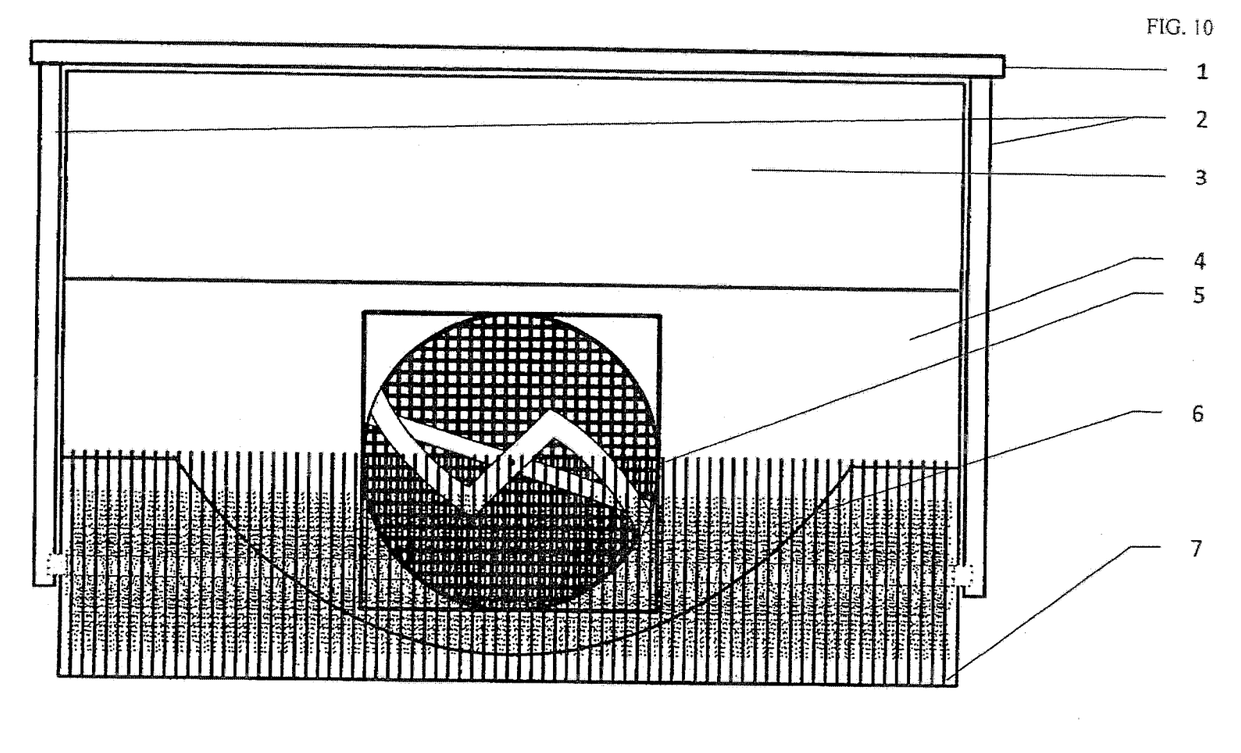

Hydraulic controller 17 is connected to suction module 11 via hydraulic lines 15. Pump(s) 13, which are also arranged on control unit 12, are connected to suction ports 9 of suction module 12 via suction hoses 14. Suction ports 9 are arranged inside suction bell 4. Drive unit 8 of cutting unit 5 is positioned on suction bell 4, wherein the cutting unit is also inside suction bell 4 and is required to cut up larger elements in the wash material (FIG. 4). Cutting unit 5 has at least two counter-rotating knives, wherein at least one knife is approximately in a "Z" shape (FIG. 10).

Figure 5:
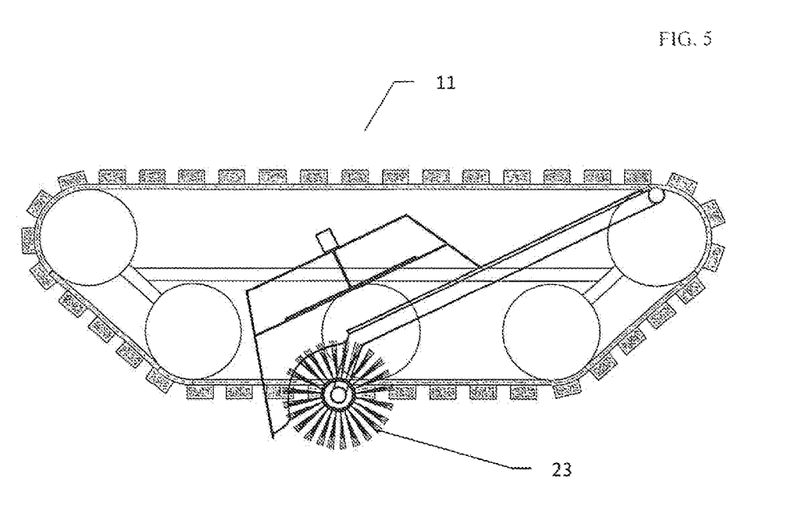
Figure 8:
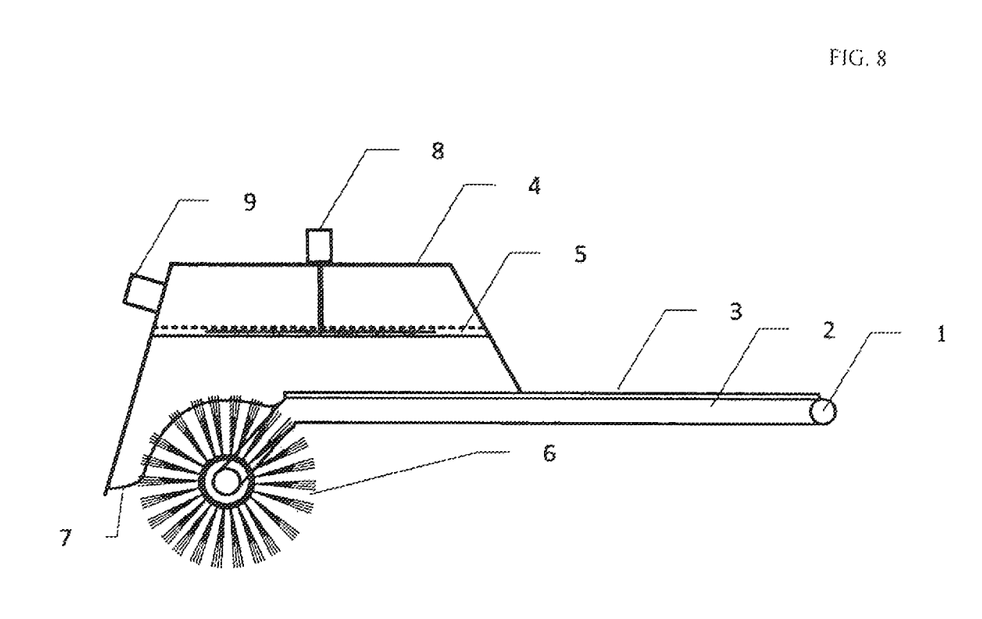
Figure 9:
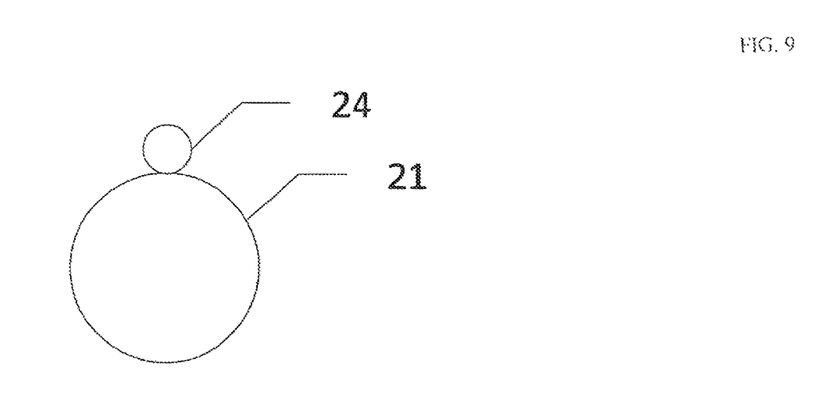
Figure 11:
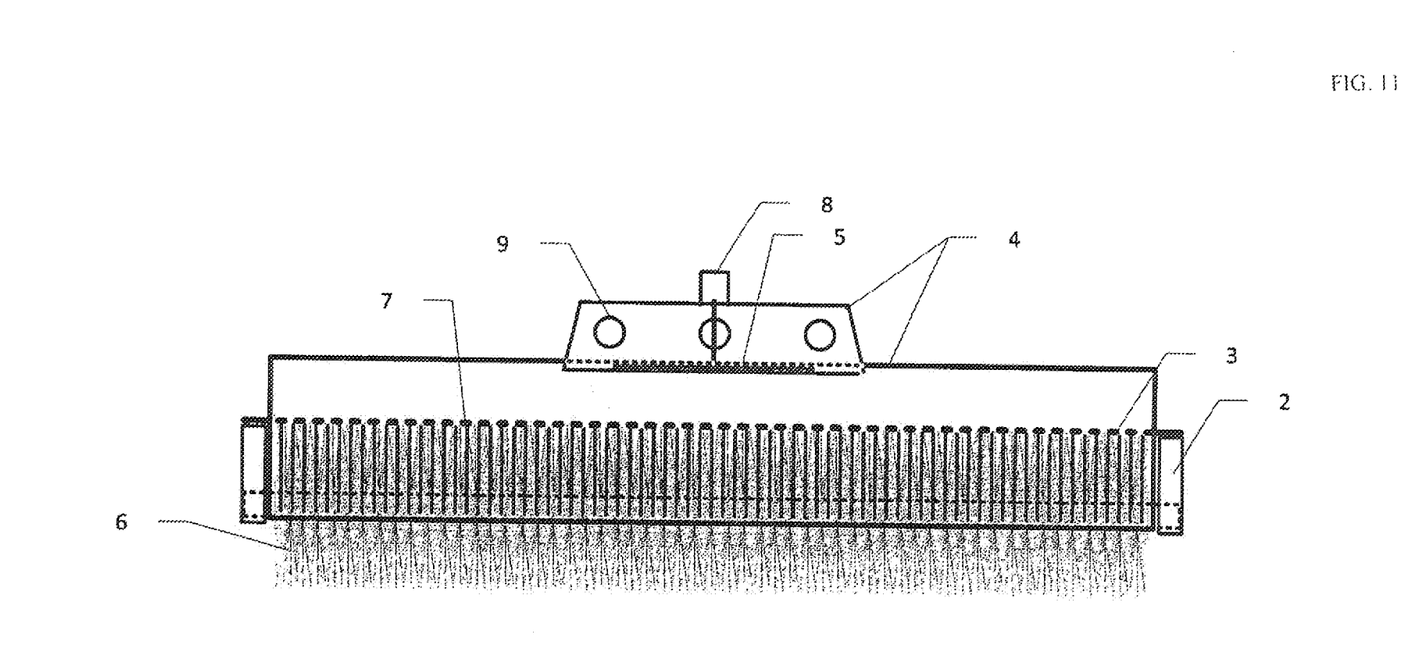

Suction bell 4 is supported on two pivoting arms 2 and on sealing plate 3 and rake 7 (FIG. 8). Pivoting arms 2 have two bearings 1, which are mounted on a pivot point on the chassis of suction module 11 (FIG. 5). In this way, pivoting arms 2 together with the rotating sweeping roller 6 arranged between them move vertically and are guided over obstacles on the bed of the body of water. Sweeping roller 6 is rotatable in both directions. It is possible to make the bristles of sweeping roller 6 interchangeable and from various materials and of a different length, depending on the nature of the water bed (FIG. 11).

Rake 7, which partially encloses sweeping roller 6 and partially engages in sweeping roller 6 cleans the roller and prevents very large, coarse items from being conveyed into the inside of suction bell 9.

Figure 6:
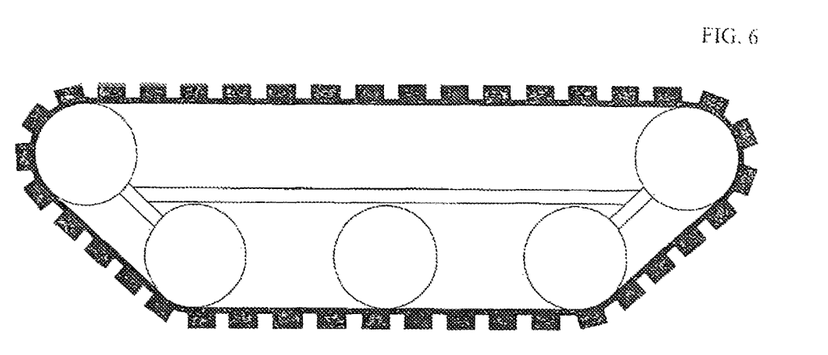

The chassis of suction module 11 is arranged outside of pivoting arms 2. It has two caterpillar tracks 10, which travel over a plurality of deflection rollers 23. In this context, the deflection rollers are arranged such that a sloping guide for the caterpillar tracks 10 regardless of the direction of travel of suction module 11, which ensures reliable movement—with no danger of seizing—over the bed of the body of water (FIG. 6). The inside of each caterpillar track 10 is furnished with a toothed rack, in which a gearwheel of the drive unit engages.

Figure 7:
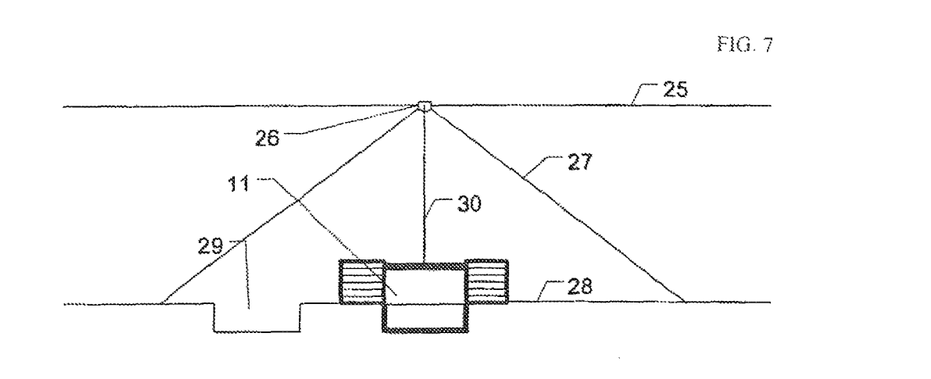

An echo-sounder 26 is arranged floating on water surface 25 directly above suction module 11. Echo-sounder 26 is used to monitor suction module 11. In this context, echo-sounder 26 is preferably connected to suction module 11 via an extendable fishing line 30. The emission cone 27 generated by echo-sounder 26 extends over suction module 11, the sludge areas 29 from which material has already been removed, and sludge areas 28 from which material has not yet been removed. In this way, it is possible to control both suction module 11 and control unit 12, so that the surfaces of the beds of the water body that must be cleaned can be distinguished clearly from the areas that have already been cleaned.

Of course, a substantially similar fastening means may also be used between echo-sounder 26 and suction module 11 instead of an extendable fishing line 30.

Alternatively, a GPS system and/or a camera system may be mounted on control unit 12 instead of or in addition to echo-sounder 26, so that suction module 11 may be controlled optimally.

The invention claimed is:

1. Device for collecting and removing plastic, sludge materials deposited on beds of bodies of water, wherein a controllable floating body is connected to a suction module via hose lines,
   wherein
   the controllable floating body is equipped with at least one pump/compressor and at least one hydraulic unit as well as at least one power set and on land is connected at one end to a sludge pond or sedimentation tank or a transportable container via pipelines and at the other end to the suction module, which
   travels independently over the bed of the body of water on a caterpillar chassis,
   is connected to an echo-sounder and/or a GPS receiver floating on the water surface above suction module via a cable,
   has a freely oscillating single- or double- or multi-arm pivoting arm that adapts autonomously to the bed of the body of water, arranged between and/or in front of and/or behind the caterpillar tracks of the caterpillar chassis, and
   a sealing plate arranged between the pivoting arm(s) and a sweeping roller,
   wherein the sweeping roller is mounted inside a suction bell,
   in which a cutting unit is arranged,
   and the suction bell has at least one flange/suction port for at least one suction hose.

2. Device according to claim 1, wherein the suction module has at least one rake scraper arranged inside the suction bell before and/or after the sweeping roller in the direction of the bed of the body of water, mainly in the direction of the cutting unit,
   wherein the sweeping roller comprises bristles, and
   wherein the rake scraper is guided around at least part of the sweeping roller and engages with at least some of the bristles of the sweeping roller.

3. Device according to claim 1, wherein a sealing plate and/or a baffle plate is fastened between the two pivoting arms above the sweeping roller, which plate or plates form a gap with the sweeping roller, which gap controls the flow speed along the length of the sweeping roller by its shape.

4. Device according to claim 1, wherein a strainer and/or a grating is/are arranged above the sweeping roller and above the sealing plate and/or the baffle plate.

5. Device according to claim 4, wherein at least one knife is arranged below the strainer and/or the grating as the rotating cutting unit.

6. Device according to claim 5, wherein a static knife in the form of a double sickle is arranged below the rotating knife.

7. Device according to claim 5, wherein the knives are constructed in a scissors design.

8. Device according to claim 5, wherein the cutting unit is driven by a motor/drive unit arranged on an outer circumference of the suction bell.

9. Device according to claim 5, wherein the pump is arranged on or on the side of the suction bell.

10. Device according to claim 9, wherein the pump is connected to the sludge pond or the sedimentation tank or the transportable container via pipelines or via the floating body or directly.

11. Device according to claim 1, wherein one or more mowing units are arranged in front of the caterpillar chassis.

12. Device according to claim 1, wherein the sweeping roller has its own drive unit.

13. Device according to claim 1, wherein the sweeping roller is capable of rotating to the left and to the right.

14. Device according to claim 1, wherein the caterpillar chassis has a rising slope at both ends.

15. Device according to claim 1, wherein the caterpillar chassis has a toothed rack, in which a drive unit engages with its gearwheel.

16. Device according to claim 1, wherein the echo-sounder and/or the GPS system and/or the camera system is arranged on the controllable floating body and is connected to the drive unit of the caterpillar chassis and a controller therefor.

17. Device according to claim 16, wherein the controller generates a systematic cleaning profile of the bed of the body of water and ensures that the suction module cleans the required sites on the bed of the body of water at least once.

18. Device according to claim 1, wherein the floating body is a catamaran or a pontoon, which has its own drive unit.

19. Device according to claim 1, wherein the pipelines and/or pressure hoses are constructed as flat hoses, to which a further hose is bonded or vulcanized for surfacing purposes.

20. Device according to claim 1, wherein the suction module is equipped with a buoyancy body.

* * * * *